(12) United States Patent
Diggins

(10) Patent No.: US 8,044,141 B2
(45) Date of Patent: Oct. 25, 2011

(54) TINTING OPTICAL SUBSTRATES

(75) Inventor: David Robert Diggins, Flagstaff Hill (AU)

(73) Assignee: Carl Zeiss Vision Australia Holdings Limited, Lonsdale (AU)

(*) Notice: Subject to any disclaimer, the term of this patent is extended or adjusted under 35 U.S.C. 154(b) by 0 days.

(21) Appl. No.: 12/817,647

(22) Filed: Jun. 17, 2010

(65) Prior Publication Data
US 2010/0256297 A1    Oct. 7, 2010

Related U.S. Application Data

(62) Division of application No. 10/548,124, filed as application No. PCT/AU2004/000271 on Mar. 3, 2004, now Pat. No. 7,763,313.

(30) Foreign Application Priority Data

Mar. 3, 2003  (AU) ................................ 2003900960

(51) Int. Cl.
*C08L 33/06* (2006.01)
*C08K 5/54* (2006.01)

(52) U.S. Cl. ........ 524/854; 524/730; 524/783; 524/849; 427/162; 427/385.5; 252/600

(58) Field of Classification Search .................. 524/730, 524/783, 849, 854; 427/162, 385.5; 252/600
See application file for complete search history.

(56) References Cited

U.S. PATENT DOCUMENTS

| | | | |
|---|---|---|---|
| 4,526,920 A * | 7/1985 | Sakashita et al. | 522/78 |
| 4,774,035 A * | 9/1988 | Carmelite et al. | 264/1.38 |
| 4,812,489 A * | 3/1989 | Watanabe et al. | 522/42 |
| 4,912,185 A | 3/1990 | Toh | |
| 4,954,591 A * | 9/1990 | Belmares | 526/264 |
| 5,130,353 A | 7/1992 | Fischer et al. | |
| 5,232,964 A | 8/1993 | Evans et al. | |
| 5,250,723 A | 10/1993 | Suzuki et al. | |
| 5,374,483 A | 12/1994 | Wright | |
| 5,426,131 A * | 6/1995 | Katsamberis | 522/16 |
| 5,619,288 A * | 4/1997 | White et al. | 351/159 |
| 5,743,920 A | 4/1998 | Kohan | |
| 5,804,301 A | 9/1998 | Curatolo | |
| 5,827,923 A | 10/1998 | Medford et al. | |

(Continued)

FOREIGN PATENT DOCUMENTS

EP    0 314 979    5/1989

(Continued)

OTHER PUBLICATIONS

Nie et al. European Polymer Journal 35 (1999) 1491-1500.*

*Primary Examiner* — David W Wu
*Assistant Examiner* — Vu A Nguyen
(74) *Attorney, Agent, or Firm* — Buchanan Ingersoll & Rooney PC

(57) ABSTRACT

The present invention provides a method for tinting an optical substrate. The method includes the steps of applying a coating composition containing:
  a polymerisable monomer having a polyoxyalkylene backbone containing at least four contiguous oxyalkylene units, and
  an abrasion resistant agent and/or a high crosslinking polymerisable monomer
to the optical substrate, polymerising the coating composition to form an abrasion resistant coating layer, and introducing a tinting compound into the coating layer to thereby tint the optical substrate. The invention also provides a coating composition and an optical substrate that is tinted according to the method of the invention.

18 Claims, 1 Drawing Sheet

U.S. PATENT DOCUMENTS

| | | | |
|---|---|---|---|
| 5,916,669 A * | 6/1999 | Parker et al. | 428/216 |
| 6,087,010 A | 7/2000 | Yoshida et al. | |
| 6,087,413 A | 7/2000 | Lake | |
| 6,551,710 B1 * | 4/2003 | Chen et al. | 428/412 |
| 6,860,600 B2 * | 3/2005 | Chen | 351/174 |
| 7,449,499 B2 * | 11/2008 | Craig et al. | 523/118 |
| 2001/0000331 A1 * | 4/2001 | Ram et al. | 428/423.1 |

FOREIGN PATENT DOCUMENTS

| | | |
|---|---|---|
| EP | 0 588 508 | 5/1997 |
| WO | WO 96/23243 | 8/1996 |
| WO | WO 9634025 A1 * | 10/1996 |
| WO | WO 01/21375 A1 | 3/2001 |
| WO | WO 03/005211 | 6/2003 |

* cited by examiner

TINTING OPTICAL SUBSTRATES

CROSS-REFERENCE TO RELATED APPLICATIONS

This application is a divisional of U.S. application Ser. No. 10/548,121 filed on Mar. 6, 2006, which is a U.S. national stage application of International Application No. PCT/AU2004/000271 filed on Mar. 3, 2004, and which claims priority to Australian Application No. 2003/900960 filed on Mar. 3, 2003, the entire contents of which are incorporated herein by reference.

FIELD

Disclosed herein are methods for coating optical substrates with a tinted or coloured coating. Also disclosed herein are compositions that can be used to coat optical substrates such as ophthalmic lenses with a tinted or coloured coating, and to optical substrates that have been coated using the methods and/or compositions disclosed herein.

DESCRIPTION OF RELATED ART

Optically transparent resins are in widespread use nowadays for the manufacture of optical substrates such as eyeglass lenses. These resins are advantageous in that they are light, robust and easily processed.

Both thermoplastic and thermoset resins are used for the manufacture of optical substrates. Particular thermoset resins that have been used include polymers of diethylene glycol bis(allyl carbonate) such as CR-39™ (a trade mark of PPG Industries) which provide optical substrates that have good transparency and heat resistance and have minimal colour aberration. Another advantage of these particular resins is that they are relatively easy to tint by introducing a tinting agent into the resin. In the field of eyeglass lenses it is fashionable to tint or dye lenses to give the lens a coloured tint.

A popular thermoplastic resin that is used in the manufacture of optical substrates is a polycarbonate of bisphenol A. This polycarbonate resin has good transparency, impact resistance and heat resistance and has a relatively high refractive index. However, polycarbonates are more difficult to dye than some of the aforementioned thermoset resins such as CR-39.

One problem associated with both thermoset and thermoplastic optical substrates, and especially with polycarbonate substrates, is their poor abrasion resistance. In order to overcome this poor abrasion resistance, abrasion resistant coatings ('hard coatings') have been developed. Unfortunately, hard coatings are often non tintable.

One class of hard coatings are the organosiloxane hard coatings. Organosiloxane coatings are often applied to thermoset lens materials. However, it is found that the more abrasion resistant the organosiloxane coating is, the less tintable it is. In general, organosiloxane resins cannot in themselves be tinted. Instead, they act as a medium through which dye molecules can pass. Therefore, irrespective of whether the organosiloxane coating is tintable it still requires the underlying substrate to be tintable.

Another class of hard coatings are the acrylate based coatings. These coatings are often used to coat thermoplastics such as polycarbonate. Abrasion resistant acrylate coatings are also generally not tintable. Hitherto, tintable acrylate coatings have very poor abrasion resistance.

One method that can be used to apply a coating to thermoset substrates is by in-mould coating. This involves applying a coating to a mould surface, partially curing the coating, assembling a mould pair, filling the mould with a substrate monomer and then curing the substrate as normal. A coated substrate is then removed from the assembly. In-mould coating is a very cost effective way of coating an optical substrate. For optical substrates such as finished lenses, it is necessary to apply a coating to both the back and front of the lens. In order to tint a finished lens it is necessary to have a tintable coating applied to one or both surfaces. Unfortunately, up to now there are no known systems suitable as a tintable in-mould coating.

There remains a need to provide a method and/or composition for tinting plastic optical substrates, including polycarbonate and thermoset optical substrates, that alleviates some of the problems with prior art methods and compositions.

Throughout this specification reference may be made to documents for the purpose of describing the background or for describing aspects embodiments disclosed herein. However, no admission is made that any reference, including any patent or patent document, cited in this specification constitutes prior art. In particular, it will be understood that, unless otherwise stated, reference to any document herein does not constitute an admission that any of these documents forms part of the common general knowledge in the art in Australia or in any other country. The discussion of the references states what their authors assert, and the applicant reserves the right to challenge the accuracy and pertinency of any of the documents cited herein.

SUMMARY

Disclosed herein is a method for tinting an optical substrate, the method including the steps of:
   applying a coating composition containing:
      a polymerisable monomer having a polyoxyalkylene backbone containing at least four contiguous oxyalkylene units, and
      an abrasion resistant agent and/or a high crosslinking polymerisable monomer
   to the optical substrate,
      polymerising the coating composition to form an abrasion resistant coating layer, and
      introducing a tinting compound into the coating layer to thereby tint the optical substrate.

Also disclosed herein is a coating composition that is suitable for forming an abrasion resistant tintable coating layer on an optical substrate, the coating composition including:
   a polymerisable monomer having a polyoxyalkylene backbone containing at least four contiguous oxyalkylene units, and
   an abrasion resistant agent and/or a high crosslinking polymerisable monomer,
wherein the coating composition is polymerisable to form an abrasion resistant coating layer on the optical substrate into which a tinting compound can be introduced.

Also disclosed herein is a tinted optical substrate that is tinted according to the method described herein or using the composition described herein.

In a preferred aspect, the relative amounts of the abrasion resistant agent (y) as a percentage w/w of solids and/or the high cross linking monomer (x) as a percentage w/w of monomers is between $y=-0.76x+68$ and $y=-0.60x+30$, more preferably between $y=-0.75x+60$ and $y=-0.60x+30$, and most preferably between $y=-0.67x+50$ and $y=-0.60\ x+30$.

The optical substrate may be any substrate that functions to transmit or reflect light. The term therefore includes optical articles such as ophthalmic lenses, and any other optical article that may require a tintable coating.

The method and composition disclosed herein may be particularly suitable for tinting optical substrates that are formed from an aromatic polycarbonate such as the polycarbonate of bisphenol A, although it will be appreciated that the methods and compositions are not necessarily limited to that particular application.

The step of coating the optical substrate may involve applying the coating composition to a preformed optical substrate or it may involve applying the coating during the formation of the optical substrate, such as in an in-mould coating process.

The tinting compound may be one or more of the fixed dyes that are known in the art. Alternatively, the tinting compound may be one or more photochromic dyes.

The oxyalkylene units of the monomer having at least four contiguous oxyalkylene units may be oxyethylene units. The monomer may be a di(meth)acrylate monomer with a long chain polyoxyethylene backbone. As used herein the term '(meth)acrylate' refers to either an acrylate group or a methacrylate group. Also as used herein the term 'oxyalkylene' refers to groups of formula —$(CH_2)_n$—O— where n is greater than or equal to two. Non-limiting examples of oxyalkylene groups include oxyethylene, oxypropylene and oxybutylene.

In one embodiment, the abrasion resistant agent is an acrylated colloidal species such as colloidal silica, titanium dioxide, zirconium dioxide or other inorganic oxide. Most preferably, the abrasion resistant agent is acrylated colloidal silica which promotes coating adhesion durability and abrasion resistance.

BRIEF DESCRIPTION OF THE FIGURE

Various embodiments will now be described in relation to the accompanying FIGURE. However, it must be appreciated that the following description is not to limit the generality of the above description.

DETAILED DESCRIPTION OF SPECIFIC EMBODIMENTS

Figure 1:
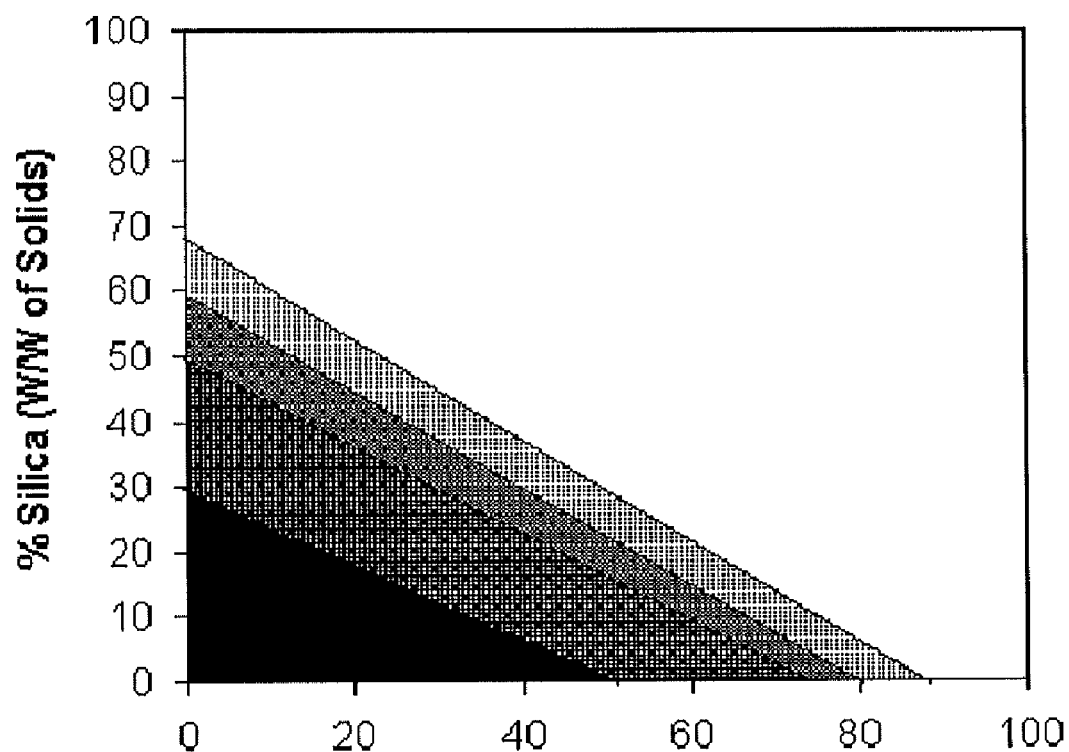
FIG. 1 shows a plot of concentration of colloidal silica vs concentration of high cross linking monomer (tris[2-acryloyloxy]ethyl]isocyanurate) and shows the effect of the concentration of each on the tintability of the composition of the invention. The data for FIG. 1 were obtained using a system in which the coating was cured under a nitrogen blanket.

In a preferred embodiment, the optical substrate is an ophthalmic lens. However it will be appreciated that this is not limiting and the composition and methods may be used to coat any transparent optical substrate.

The coating composition described herein includes a monomer having a polyoxyalkylene backbone containing at least four oxyalkylene units, an abrasion resistant agent and/ or a high crosslinking monomer. The composition can be coated onto a preformed lens or onto a mould surface prior to casting of a lens in an in-mould coating process. The basic in-mould coating process is similar to the one described in International patent application WO01/21375, which is incorporated herein solely for the purpose of exemplifying in-mould coating processes.

The in-mould coating process typically involves coating the casting face of a mould section with the composition described herein, optionally in a suitable solvent. The composition may be applied by a variety of techniques including spraying, dipping, brushing, flow coating, spin coating and the like. The composition may then be partially or fully cured, for example by UV initiated partial polymerisation. The degree of polymerisation may be controlled as described in WO01/21375.

After coating the mould section with the composition and partial curing and/or solvent removal, the mould pieces are fitted together to form a coated mould cavity. Lens monomer is then poured into the mould and the plastic is cured in the usual way.

The monomer having a polyoxyalkylene backbone containing at least four oxyalkylene units may be present in the coating composition in an amount of from about 10 to about 100% as a w/w of the total monomer (i.e. polyoxyalkylene monomer and high cross linking monomer). The monomer having a polyoxyalkylene backbone containing at least four oxyalkylene units may be a monomer containing a long chain polyoxyethylene backbone and is preferably a di(meth)acrylate monomer with a long chain polyoxyethylene backbone. Suitable polyoxyethylene di(meth)acrylates include polyethylene glycol (200) di(meth)acrylate, polyethylene glycol (400) di(meth)acrylate and polyethylene glycol (600) di(meth)acrylate.

The abrasion resistant agent is acrylated colloidal silica although other acrylated colloidal species such as titanium dioxide, zirconium dioxide or other inorganic oxide could also be used. The abrasion resistant agent promotes coating adhesion durability and abrasion resistance. Preferably, the acrylated colloidal silica does not contain any significant amounts of hexane diol diacrylate. Hexane diol diacrylate (HDDA) is commonly used as a dispersant in commercial acrylated colloidal silica preparations. The amount of acrylated colloidal silica that is present in the composition may vary between 0% and about 70% (w/w solids) however, as discussed in more detail later, the amount used will depend on the amount of high cross linking monomer that is present in the composition.

As used herein, the term "high cross linking monomer" refers to a monomer that has a rigid backbone or a flexible backbone attached to a rigid core (such as an aromatic ring) wherein polymerisation of the high cross linking monomer provides a polymer having a high level of abrasion resistance. The level of abrasion resistance of the polymerised coating can be determined using standard tests, the details of which are provided in the examples provided herein.

The high crosslinking monomer may be tris[2-(meth)acryloyloxy]ethyl]isocyanurate, tris(2-hydroxyethyl)isocyanurate di(meth)acrylate, N,N',N"-tris(meth)acrylhexahydro-s-triazine, pentaerythritol tetra(meth)acrylate, dipentaerythritol hexa(meth)acrylate, pentaerythritol tetra (meth)acrylate, tris(2-hydroxyethyl)isocyanurate tri(meth) acrylate, trimethylol propyl tri(meth)acrylate, dipentaerythritol hexa(meth)acrylate, 2,2,4,4,6,6-hexahydro-2,2,4,4,6,6-hexakis(2-((2-methyl-1-oxo-2-propenyl)oxy)ethoxy)-1,3,5, 2,4,6-triazatriphosphorine, tetra-, penta- and hexa-functional urethane (meth)acrylates and tricyclodecane dimethanol di(meth)acrylate. High crosslinking monomers with polar backbones such as tris[2-(meth)acryloyloxy]ethyl]isocyanurate, and tris(2-hydroxyethyl)isocyanurate di(meth)acrylate and N,N',N"-tris(meth)acrylhexahydro-s-triazine are most preferable as their polarity enhances the inherent tintability of the coating composition. The use of tris[2-(meth)acryloyloxy]ethyl]isocyanurate, and tris(2-hydroxyethyl)isocyanurate di(meth)acrylate and N,N',N"-tris(meth)acrylhexahydro-s-triazine in the coating composition also enables the coated optical substrate to be overcoated with hard coatings.

The high crosslinking monomer may be present in the coating composition in an amount of from about 0 to about 80% as a w/w of the total monomer (i.e. high cross linking monomer and long chain polyoxyalkylene monomer). Again, the amount used will depend on the amount of high crosslinking monomer that is present in the composition.

The formulation regime for the coating composition is best represented by the diagram shown in FIG. 1 and by Equation (I). The filled regions of the plot represent the tintable region. The darkest cross hatched region (designated by reference numeral 5 in FIG. 1) ( ) ▨ presents the most preferable region in terms of tint rate and property performance. The lighter cross hatched regions (and) denote similar property performance but lower tint rates. The black region (designated by reference numeral 6 in FIG. 1) represents unacceptable abrasion resistance. The white region is the non-tintable region. From the diagram, it can be seen that the monomer ratio preference is dependent upon the level of silica. If the silica is low, higher levels of tris[2-acryloyloxy)ethyl]isocyanurate are required. If the silica is high, higher levels of polyethylene glycol (400) di(meth)acrylate are required.

When the data of FIG. 1 is represented algebraically, the relative amounts of the abrasion resistant agent (y) as a percentage w/w of solids and/or the high crosslinking monomer (x) as a percentage w/w of monomers is between:

$y=-0.76x+68$ (designated by line 1 in FIG. 1) and $y=-0.60x+30$ (designated by line 2 in FIG. 1)

(ie. the shaded area ▨  ▨  ▨

More preferably, the composition can be in the region between $y=-0.75x+60$ (designated by line 3 in FIG. 1) and $y=-0.60x+30$ (designated by line 2 in FIG. 1)

(ie. the shaded area); ▨  ▨

Most preferably, the composition can be in the region between $y=-0.67x+50$ (designated by line 4 in FIG. 1) and $y=-0.60x+30$ (designated by line 2 in FIG. 1)

(ie. the shaded area between these lines). ▨

From the diagram shown in FIG. 1, for one axial extreme, when acrylated silica is not present, the weight percentage of tris[2-(acryloyloxy)ethyl]isocyanurate is preferably between about 50 and about 90%. Most preferably, when acrylated silica is not present, the weight percentage of tris[2-(acryloyloxy)ethyl]isocyanurate is between about 50 and about 75%. For the other axial extreme, when tris[2-(acryloyloxy)ethyl] isocyanurate is not present, the weight percentage of acrylated colloidal silica is preferably between about 30 and about 68%. Most preferably, when tris[2-(acryloyloxy)ethyl]isocyanurate is not present, the weight percentage of acrylated colloidal silica is between about 30 and about 50%.

The coating layer that is formed provides good abrasion resistance. For example, using tris[2-(acryloyloxy)ethyl]isocyanurate and polyethylene glycol (400) di(meth)acrylate it is possible to achieve abrasion resistances that are up to 3 times more abrasion resistant in the standard Bayer test than uncoated CR-39, and up to 20 times more abrasion resistant in the standard steel wool test than uncoated CR-39.

One key difference between a coating used as an in-mould coating compared to one used as a polycarbonate coating is the solvent that is used with the coating composition. In the case of in-mould coating, the choice of solvent is not critical. In the case of a polycarbonate coating, the choice of solvent is critical. When the method is used for tinting polycarbonate optical lenses the coating composition preferably includes a solvent to promote adhesion of the coating to the polycarbonate. If the solvent is not sufficiently aggressive to polycarbonate then the level of adhesion of the coating to the polycarbonate lens substrate will not be sufficient. Alternatively, if the solvent selected is too aggressive than the coating will become hazy. Suitable solvents include ketones such as methyl isobutyl ketone, and esters such as ethyl acetate. However, the aggressiveness of these solvents may need to be tempered by the addition of alcohol such as isopropanol or n-butanol.

Surprisingly, it has been found that the solvent combination selected may have an influence on the tint rate of the cured coating. Without being bound by theory it can be speculated that solvent cage effects may affect the cure mechanism and hence affect the structure of the polymer matrix formed. In this regard, it was found that the use of esters was advantageous over ketones in terms of increasing the rate of tint uptake.

After a lens substrate has been coated with the composition of the invention the composition is preferably fully or, partially cured. Preferably high intensity UV and/or high efficiency photoinitiators are used to overcome oxygen inhibition during polymerisation of the coating composition. The optimal photoinitiator depends upon the spectrum and intensity of the irradiating light source. High intensity UV lamps that are available from Fusion Corporation and Xenon Corporation are suitable.

Suitable photopolymerisation initiators are acryloin and derivatives thereof, such as benzoin, benzoin methyl ether, benzoin ethyl ether, benzoin isopropyl ether, benzoin isobutyl ether, and $\alpha$-methylbenzoin; diketones such as benzil and diacetyl, etc; organic sulfides such as diphenyl monosulfide, diphenyl disulfide, decylphenylsulfide, and tetramethylthiuram monosulfide; S-acyl dithiocarbamates, such as S-benzoyl-N,N-dimethyldithiocarbamate; phenones such as acetophenone, $\alpha,\alpha,\alpha$-tribromacetophenone, $\alpha,\alpha$-diethoxyacetophenone, $\alpha,\alpha$-dimethoxy-$\alpha$-phenylacetophenone, o-nitro-$\alpha,\alpha,\alpha$-tribromacetophenone, benzophenone, and p,p'-bis (dimethylamino)benzophenone; aromatic iodonium and aromatic sulfonium salts, sulfonyl halides such as p-toluenesulfonyl chloride, 1-naphthalenesulfonyl chloride, 2-naphthalenesulfonyl chloride, 1,3-benzenedisulfonyl chloride, 2,4-dinitrobenzenesulfonyl bromide, and p-acetamidobenzenesulfonyl chloride.

Although the choice of photoinitiator is not restricted to any specific class, consideration needs to be given so that a residual colour is not imparted to the cured coating. Examples of photoinitiators available commercially include: Lucirin TPO, Irgacure 651, Irgacure 819, Irgacure 1800, Irgacure 500, Irgacure 907, Darocure 4043, Darocure 1664, Darocure 1116 and Vicure 55

Depending upon the choice of photoinitiator and irradiation source, curing may or may not need to be undertaken in an oxygen depleted environment. However, if optimal irradiation sources and photoinitiators are selected the difference in performance between coating resins cured in air versus those cured in an oxygen depleted environment is marginal. Curing in an environment depleted of oxygen also widens the choice of irradiation sources and photoinitiators.

If curing is carried out in air, it may be necessary to increase the amount of abrasion resistant agent and/or high cross linking monomer in order to obtain satisfactory abrasion resistance. For this reason the range of viable coatings that can be obtained with an oxygen depleted curing system (eg. a nitrogen blanketed system) is greater than for an air cured system.

The composition may also be polymerised by curing using thermal initiators. The use of such an initiator may also need to be undertaken in an oxygen depleted environment. The initiator may be any of the suitable thermal initiators known in the art. The nature of the initiator utilised in the composition is dependent upon the ethylenically unsaturated material used. For example, for those ethylenically unsaturated materials that undergo free radical polymerisation, suitable initiators are compounds that liberate or generate a free-radical on addition of energy. Such initiators include peroxy, azo, and redox systems each of which are well known and are described in polymerisation art.

Included among the free-radical initiators are the conventional heat activated catalysts such as organic peroxides and organic hydroperoxides. Examples of these catalysts are benzoyl peroxide, tertiary-butyl perbenzoate, cumene hydroperoxide, azobis(isobutyronitrile) and the like.

Suitable tinting compounds include dyes that are typically used by optical laboratories, such as BPI dyes from Brain Power Incorporated, Perma Dyes from Inland, Shades Lens Dyes from Cerium Optical The process of tinting typically involves the immersion of a lens in a heated solution (generally water based) of dissolved dyes. However, an alternate tint process does exist whereby lenses can be immersed in a dye solution that is subsequently heated in a microwave.

When the dye molecules are photochromic dyes, the dyes can be incorporated into a coating by applying a second coating that contains photochromic dyes over the coating of this invention. The lens, together with the two coatings is then heated to a high temperature to allow for the diffusion of the photochromic dyes from the coating containing the photochromic dye into the coating of this invention. The original coating containing the photochromic dye is then removed leaving the coating of this invention now containing photochromic dye. This process is commonly known as an imbibition process and is described in U.S. Pat. No. 5,130,353.

The chemical nature of a coating resin required to accept dye molecules is similar to that required to accept photochromic dye molecules. However, in the case of photochromic dyes their incorporation into a coating is more problematic than with dye molecules. Photochromic dye molecules are larger and also require higher concentrations per unit volume of coating resin to be effective.

Suitable photochromic dyes can be selected from one or more of the group consisting of anthraquinones, phthalocyanines, spiro-oxazines, chromenes, pyrans and fulgides.

Examples of preferred photochromic dyes may be selected from the group consisting of:

1,3-dihydrospiro[2H-anthra[2,3-d]imidazole-2,1'-cyclohexane]-5,10-dione,
1,3-dihydrospiro[2H-anthra[2,3-d]imidazole-2,1'-cyclohexane]-6,11-dione,
1,3-dihydro-4-(phenylthio)spiro[2H-anthra-1',2-diimidazole-2,1'-cyclohexane-6,11-dione,
1,3-dihydrospiro[2-H-anthra[1,2-d]imidazole-2,1'-cycloheptane]-6,11-dione,
1,3,3-trimethylspiroindole-2,3'-[3H]naphtho[2,1-b]-1,4-oxazine,
2-methyl-3,3'-spiro-bi-[3H-naphtho[2,1-bipyran](2-Me),
2-phenyl-3-methyl-7-methoxy-8'-nitrospiro[4H-1-benzopyran-4,3'-[3H]-naphtho]2,1-b]pyran,
spiro[2H-1-benzopyran-2,9'-xanthene],
8-methoxy-1',3'-dimethylspiro(2H-1-benzopyran-2,2'-(1'H)-quinoline,
2,2'-spiro-bi-[2H-1-benzopyran],
5'-amino-1',3',3'-trimethylspiro[2H-1-benzopyran-2,2'-indoline,
ethyl-β-methyl-β-(3',3'-dimethyl-6-nitrospiro(2H-1-benzopyran-2,2'-indolin-1'-yl)-propenoate,
(1,3-propanediyl)bis[3',3'-dimethyl-6-nitrospiro[2H-1-benzopyran-2,2'-indoline],
3,3'-dimethyl-6-nitrospiro[2H-1-benzopyran-2,2'-benzoxazoline],
6'-methylthio-3,3'-dimethyl-8-methoxy-6-nitrospiro[2H-1-benzopyran-2,2'-benzothiozoline],
(1,2-ethanediyl)bis[8-methoxy-3-methyl-6-nitrospiro[2H-1-benzopyran-2,2'-benzothiozoline]
N-N'-bis(3,3'-dimethyl-6-nitrospiro[2H-1-benzopyran-2,2'(3'H)-benzothioazol-6'-yl)decanediamide],
α-(2,5-dimethyl-3-furyl)ethylidene(Z)-ethylidenesuccinicanhydride,
α-(2,5-dimethyl-3-furyl)-α',δ-dimethylfulgide,
2,5-diphenyl-4-(2'-chlorophenyl)imidazole,
(2',4'-dinitrophenyl)methyl-1H-benzimidazole,
N,N-diethyl-2-phenyl-2H-phenanthro[9,10-d]imidazol-2-amine and
2-nitro-3-aminofluoren 2-amino-4-(2'-furanyl)-6H-1,3-thiazine-6-thione.

A method of imbibition of photochromic dyes into a lens that is particularly suited to the coating of this invention is as described in U.S. Pat. No. 5,130,353.

In order to provide a photochromic system of desired intensity, a sufficient amount of photochromic dye needs to be present. If a hard coated optical element is to be imbibed with photochromic dye either a thin readily imbibable coating is applied over a readily imbibable element or the readily imbibable coating needs to be of sufficient thickness to accommodate a sufficient level of photochromic dye. Generally a coating depth of about 30 microns is required to be imbibed. Such readily imbibable coating can be applied either via an in-mould coating process or via a conventional coating process.

Reference will now be made to examples that embody the above general principles disclosed herein. However, it is to be understood that the examples are specific embodiments, and that the following description is not to limit the generality of the above description.

Example 1

The following composition was used in a spin coating process for a polycarbonate lens as described herein.

Acrylated colloidal silica is supplied as a concentrate in polyethylene glycol (400) diacrylate. On analysis the chemical breakdown of the concentrate is as follows:

| | |
|---|---|
| Silica Content | 56.6% |
| Solids content of silica | 80.6% |
| Isopropanol | 10.0% |
| Methyl isobutyl ketone | 7.1% |
| Water | 2.3% |

Final Resin Formulation desired:

| | |
|---|---|
| tris[2-(acryloyloxy)ethyl]isocyanurate | 20% (w/w monomer) |
| polyethylene glycol (400) di(meth)acrylate | 80% (w/w monomer) |
| Acrylated Colloidal Silica | 20% (w/w solids) |
| Irgacure 651 | 5% (w/w solids) |
| BYK 300 | 0.8% (w/w solids) |
| Solids | 50% (w/w) |
| Ethyl Acetate (plus residual solvent)* | 50% (w/w) |

*The solvent consists mainly of the added ethyl acetate. However there is residual methyl isobutyl ketone, isopropanol and water present in the acrylated colloidal silica that will contribute to the final formulation.

Procedure

To a 200 ml beaker is added 22.0 g of polyethylene glycol (400) diacrylate, 7.4 g of tris[2-(acryloyloxy)ethyl]isocyanurate, 21.9 g of acrylated colloidal silica, 45.8 g of ethyl acetate, 0.4 g of Byk 300 and 2.5 g of benzophenone are added. The beaker is covered with aluminium foil to prevent stray UV initiating polymerisation. This mix will yield the following exact formulation:

| | |
|---|---|
| tris[2-(acryloyloxy)ethyl]isocyanurate | 20% (w/w monomer) |
| polyethylene glycol (400) diacrylate | 80% (w/w monomer) |
| Acrylated Colloidal Silica | 20% (w/w solids) |
| Irgacure 651 | 5% (w/w solids) |
| BYK 300 | 0.8% (w/w solids) |
| Ethyl acetate | 45.8% (w/w) |
| Isopropanol | 2.2% (w/w) |
| Methyl isobutyl ketone | 1.6% (w/w) |
| Water | 0.5% (w/w) |
| Solids | 50% (w/w) |

The composition was spin coated onto a polycarbonate lens using standard coating procedures.

Mode of Cure

The composition was cured by 15 seconds exposure to a Fusion Corporation D lamp with nitrogen blanketing.

Method of Tinting 100 ml of BPI Black (from Brain Power Incorporated) is added to 1 liter of water, mixed and heated to 96° C. Lenses are dipped into the solution for a set period of time and transmission measured. This procedure is repeated periodically until the desired transmission is reached. The total time the lens is in the tinting solution is recorded.

Properties

| | |
|---|---|
| Steel Wool | ★★★★★ |
| Bayer | ★★★★ |
| Time to reach 20% T | 10 mins |

The Bayer and steel wool abrasion resistance rankings are based upon the abrasion resistance of a selected material relative to CR-39. Abrasion resistance is quantified in terms of the amount of haze developed when a lens is abraded. The higher the level of haze the less abrasion resistant a lens is. The star rating is based on the ratio of the level haze for a sample lens to the level of haze for an uncoated CR-39 lens. The star rating is based on the following haze ratios.

Steel Wool Abrasion Resistance

| | |
|---|---|
| <0.5 | no stars |
| 0.5~1.0 | ★ |
| 1.0~1.5 | ★★ |
| 1.5~2.5 | ★★★ |
| 2.5~10 | ★★★★ |
| >10 | ★★★★★ |

Bayer Abrasion Resistance

| | |
|---|---|
| <0.5 | no stars |
| 0.5~1.0 | ★ |
| 1.0~1.5 | ★★ |
| 1.5~2.5 | ★★★ |
| 2.5~5 | ★★★★ |
| >5 | ★★★★★ |

Example 2

The following composition was used in a spin coating process for a polycarbonate lens as described herein.

| | |
|---|---|
| tris[2-(acryloyloxy)ethyl]isocyanurate | 30% (w/w monomer) |
| polyethylene glycol (400) diacrylate | 70% (w/w monomer) |
| Acrylated Colloidal Silica | 25% (w/w solids) |
| Benzophenone | 5% (w/w solids) |
| BYK 300 | 0.8% (w/w solids) |
| Solids | 50% (w/w) |
| Ethyl Acetate(plus residual solvent) | 50% (w/w) |

Mode of Cure

The composition was cured by 15 seconds exposure to a Fusion Corporation D-lamp in air.

Properties

| | |
|---|---|
| Steel Wool | ★★★★-★★★★★★ |
| Bayer | ★★★ |
| Time to reach 20% T | 40 mins |

Example 3

The following composition was used in a spin coating process for a polycarbonate lens as described herein.

| | |
|---|---|
| tris[2-(acryloyloxy)ethyl]isocyanurate | 40% (w/w monomer) |
| polyethylene glycol (400) diacrylate | 60% (w/w monomer) |
| Acrylated Colloidal Silica | 20% (w/w solids) |
| Benzophenone | 5% (w/w solids) |
| BYK 300 | 0.8% (w/w solids) |
| Solids | 50% (w/w) |
| Ethyl Acetate(plus residual solvent) | 50% (w/w) |

Mode of Cure 15 seconds exposure to a Fusion Corporation D lamp in air.

Properties

| | |
|---|---|
| Steel Wool | ★★★★★ |
| Bayer | ★★★ |
| Time to reach 50% T | 15 mins |

Example 4

The following composition was used in an in-mould coating process for a CR-39 lens as described herein.

| | |
|---|---|
| tris[2-(acryloyloxy)ethyl]isocyanurate | 20% (w/w monomer) |
| polyethylene glycol (400) diacrylate | 80% (w/w monomer) |
| Acrylated Colloidal Silica | 20% (w/w solids) |
| Irgacure 651 | 5% (w/w solids) |
| BYK 300 | 0.8% (w/w solids) |
| Solids | 14% (w/w) |
| Methyl Acetate (plus residual solvent) | 86% (w/w) |

Mode of Cure

The composition was applied to the back surface of a front mould and partially cured with ~5 seconds exposure to a Fusion Corporation D-lamp in air. The back and front mould was assembled and filled with CR-39 monomer and thermally cured using standard processes.

Properties

| | |
|---|---|
| Steel Wool | ★★★★ |
| Bayer | ★★★★ |
| Time to reach 50% T | 7 mins |

(Back surface masked)

Example 5

The following composition was used in a spin coating process for a polycarbonate lens as described herein

| | |
|---|---|
| polyethylene glycol (400) diacrylate | 100% (w/w monomer) |
| Acrylated Colloidal Silica | 40% (w/w solids) |
| Irgacure 651 | 5% (w/w solids) |
| BYK 300 | 0.8% (w/w solids) |
| Solids | 50% (w/w) |
| Ethyl Acetate (plus residual solvent) | 50% (w/w) |

Mode of Cure 15 seconds exposure to a Fusion Corporation D lamp in air.

Properties

| | |
|---|---|
| Steel Wool | ★★★★★ |
| Bayer | ★★★ |
| Time to reach 50% T | 10 mins |

Example 6

The following composition was used in a spin coating process for a polycarbonate lens as described herein

| | |
|---|---|
| tris[2-(acryloyloxy)ethyl]isocyanurate | 70% (w/w monomer) |
| polyethylene glycol (400) diacrylate | 30% (w/w monomer) |
| Acrylated Colloidal Silica | 0% (w/w solids) |
| Irgacure 651 | 5% (w/w solids) |
| BYK 300 | 0.8% (w/w solids) |
| Solids | 50% (w/w) |
| Ethyl Acetate (plus residual solvent) | 50% (w/w) |

Mode of Cure 15 seconds exposure to a Fusion Corporation D lamp in air.

Properties

| | |
|---|---|
| Steel Wool | ★★★★ |
| Bayer | ★★ |
| Time to reach 50% T | 35 mins |

Finally, there may be other variations and modifications made to the preparations and methods described herein that are also within the scope of the present invention.

What is claimed is:

1. A coating composition that is suitable for forming an abrasion resistant tintable coating layer on an optical substrate, the coating composition including:

a polymerisable monomer having a polyoxyalkylene backbone containing at least four contiguous oxyalkylene units, and an abrasion resistant agent and a high crosslinking polymerisable monomer, wherein the coating composition is polymerisable to form an abrasion resistant coating layer on the optical substrate into which a tinting compound can be introduced, and wherein the relative amounts of the abrasion resistant agent (y) as a percentage w/w of solids and the high cross linking monomer (x) as a percentage w/w of monomers is between y=−0.76x+68 and y=−0.60x+30.

2. A coating composition for tinting an optical substrate as in claim 1 wherein the relative amounts of the abrasion resistant agent (y) as a percentage w/w of solids and the high cross linking monomer (x) as a percentage w/w of monomers is between y=−0.75x+60 and y=−0.60x+30.

3. A coating composition for tinting an optical substrate as in claim 2 wherein the relative amounts of the abrasion resistant agent (y) as a percentage w/w of solids and the high cross linking monomer (x) as a percentage w/w of monomers is between y=−0.67x+50 and y=−0.60x+30.

4. A coating composition as in claim 1 wherein the polymerisable monomer having a polyoxyalkylene backbone has a polyoxyethylene backbone.

5. A coating composition as in claim 4 wherein the monomer having a polyoxyalkylene backbone is a diacrylate monomer.

6. A coating composition as in claim 4 wherein the monomer having a polyoxyalkylene backbone is a dimethacrylate monomer.

7. A coating composition as in claim 4 wherein the monomer having a polyoxyalkylene backbone is selected from the group consisting of polyethylene glycol (200) diacrylate, polyethylene glycol (400) diacrylate, polyethylene glycol (600) diacrylate, polyethylene glycol (200) dimethacrylate, polyethylene glycol (400) dimethacrylate and polyethylene glycol (600) dimethacrylate.

8. A coating composition as in claim 7 wherein the abrasion resistant agent is an acrylated colloidal species.

9. A coating composition as in claim 8 wherein the acrylated colloidal species is selected from the group consisting of colloidal silica, titanium dioxide and zirconium dioxide.

10. A coating composition as in claim 9 wherein the acrylated colloidal species is acrylated colloidal silica.

11. A coating composition as in claim 10 wherein the high crosslinking monomer is selected from the list consisting of tris[2-(meth)acryloyloxy]ethyl]isocyanurate, tris(2-hydroxyethyl)isocyanurate di(meth)acrylate, N,N',N"-tris(meth)acrylhexahydro-s-triazine, pentaerythritol tetra(meth)acrylate, tris(2-hydroxyethyl)isocyanurate tri(meth)acrylate, triethylol propyl tri(meth)acrylate, dipentaerythritol hexa(meth)acrylate, 2,2,4,4,6,6-hexahydro-2,2,4,4,6,6-hexakis(2-((2-methyl-1-oxo-2-propenyl)o-xy) ethoxy)-1,3,5,2,4,6-triazatriphosphorine, tetra-, penta- and hexa-functional urethane (meth)acrylates and tricyclodecane dimethanol di(meth)acrylate.

12. A coating composition as in claim 11 wherein the high crosslinking monomer is tris[(2-acryloyloxy)ethyl]isocyanurate.

13. A coating composition as in claim 11 wherein the high crosslinking monomer is tris(2-hydroxyethyl)isocyanurate diacrylate.

14. A coating composition as in claim 11 wherein the coating composition includes a solvent.

15. A coating composition as in claim 14 wherein the solvent is selected from the group consisting of ketones and esters.

16. A coating composition as in claim 15 wherein the solvent is methyl isobutyl ketone.

17. A coating composition as in claim 15 wherein the solvent is ethyl acetate.

18. A coating composition as in claim 17 wherein the solvent also includes isopropanol or n-butanol.

* * * * *